United States Patent [19]
Van Der Valk

[11] 4,246,609
[45] Jan. 20, 1981

[54] SWITCHABLE SYNCHRONIZING-SIGNAL GENERATOR SUITABLE FOR SEVERAL TELEVISION STANDARDS

[75] Inventor: Nicolaas J. L. Van Der Valk, Breda, Netherlands

[73] Assignee: U.S. Philips Corporation, New York, N.Y.

[21] Appl. No.: 960,526

[22] Filed: Nov. 14, 1978

[30] Foreign Application Priority Data

Dec. 27, 1977 [NL] Netherlands .......................... 7714397

[51] Int. Cl.³ .............................................. H04N 5/02
[52] U.S. Cl. ..................................... 358/140; 358/150
[58] Field of Search ................................. 358/140, 150

[56] References Cited

U.S. PATENT DOCUMENTS

3,676,585   7/1972   Kaneko et al. ........................ 358/140

*Primary Examiner*—Richard Murray
*Attorney, Agent, or Firm*—T. A. Briody; W. J. Streeter; L. A. Wright

[57] ABSTRACT

A switchable synchronizing-signal generator suitable for several television standards, information being supplied from a series arrangement of a clock pulse generator and frequency dividers to a synchronizing signal generator. The generator has a position for the N-standard which is a modified position for the M-standard, because the supply of pulses of double the line frequency to a divide-by-525 dividers is blocked during 50 line periods of each field period.

3 Claims, 1 Drawing Figure

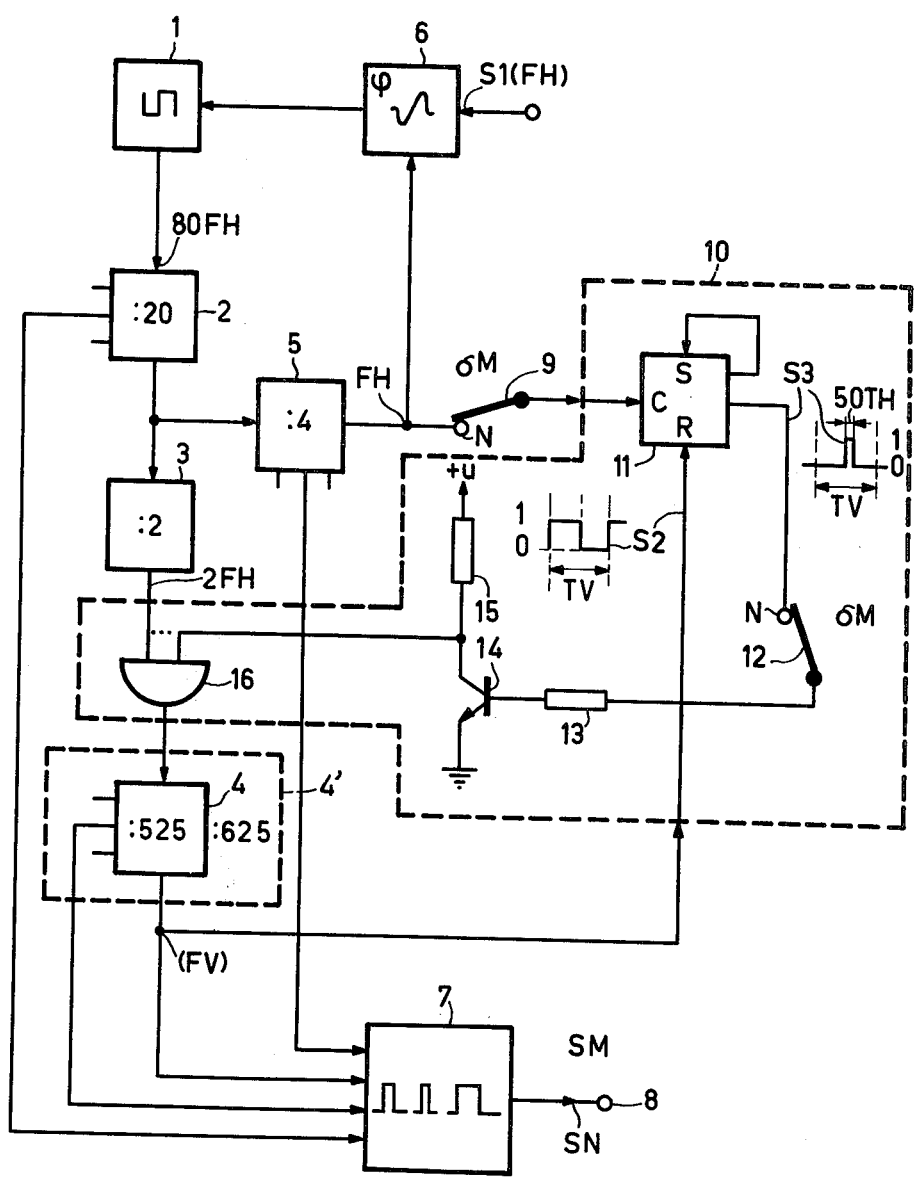

SWITCHABLE SYNCHRONIZING-SIGNAL GENERATOR SUITABLE FOR SEVERAL TELEVISION STANDARDS

BACKGROUND OF THE INVENTION

The invention relates to a switchable synchronizing-signal generator suitable for several television standards, comprising a clock pulse generator, frequency dividers connected thereto and a signal generator connected to the series arrangement of generator and dividers for supplying a synchronizing signal, the dividers being of such a construction that they are switchable for converting the standards.

Such a switchable synchronizing-signal generator is disclosed in U.S. Pat. No. 3,935,387. In particular, an embodiment is described suitable for the B-standard with 625 lines (CCIR-standard) and for the M-standard with 525 lines (RTMA-standard), the generator being suitable in both standards for generating the synchronizing signal for black-white and color television.

SUMMARY OF THE INVENTION

It is an object of the invention to provide a synchronizing-signal generator which, with a few additions, is suitable for generating a synchronizing-signal in accordance with the N-standard. To this end a sychronizing-signal generator is characterized in that, for generating a synchronizing signal according to the N-standard with 625 lines and a field frequency of 50 Hz, the synchronizing-signal generator comprises a pulse blocking stage for blocking, during 50 line periods of each field period, the supply of pulses of double the line frequency to a divide-by-525 divider, the synchronizing-signal generator further being switched-on for the M-standard.

The invention is based on the recognition that, when the generator is switched on for the M-standard it is possible to generate the synchronizing-signal for the N-standard by switching the divide-by-525 divider, dividing to the field frequency, over to a divide-by-625 divider by blocking the supply of the pulses of double the line frequency during 50 line periods of each field period.

The invention will be further explained by way of non limitative example with reference to the accommpanying FIGURE showing the invention in block diagram form.

DESCRIPTION OF THE PREFERRED EMBODIMENT

In this FIGURE reference numeral 1 denotes a clock pulse generator generating a clock pulse signal with a frequency equal to 80 times a line frequency FH. As described in the above-mentioned Patent the clock pulse frequency may also be an integral multiple of 80 FH. The clock pulses are applied to a divide-by-20 divider 2, the output of which is connected to a divide-by-2 divider 3, followed by a divide-by-525 divider 4, and to a divide-by-4 divider 5. The divider 5 feeds pulses of the line frequency FH to the input of a phase discriminator 6, to another input of which a synchronizing signal S1 of the line frequency FH is applied and which is connected to a control input of the clock pulse generator 1. Reference numeral 7 denotes a synchronizing-signal generator, inputs of which are connected to one or more outputs of dividers 2, 4 and 5 for generating, at an output 8, a synchronizing signal laid down in a standard. For simplicity, the FIGURE does not show all the outputs and their connections of the dividers 2, 4 and 5. Furthermore, the drawing does not show the switchability of the dividers 2 to 5 inclusive for all the different possibilities of the standards.

The above-mentioned Patent describes that applying a synchronizing signal S1 of the line frequency FH in accordance with the (black-white) M-standard equal to 15,750 Hz causes the synchronizing signal generator 7 to supply a synchronizing signal SM, laid down in accordance with this standard, at the output terminal 8. The signal SM appears at a field frequency FV = 60 Hz, 6 pre-equalizing, 6 field-serration and 6 post-equalizing pulses being generated in a portion of the field blanking period.

In accordance with the invention the M-position of the generator shown in the drawing is further utilised with the addition of a few components for generating the synchronizing signal in accordance with the N-standard, it holding that: line frequency FH = 15,625 Hz, field frequency FV = 50 Hz, and 6 pre-equalizing, 6 post-equalizing and 6 field serration pulses being generated in the field blanking period. To this end the generator shown in the drawing comprises a selector switch 9. A selector contact M of switch 9 is free so that when switch 9 switches to contact M the generator generates the synchronizing signal SM in accordance with the M-standard at the output terminal 8 in the manner described in said Patent. A selector contact N of switch 9 is connected to the output of divider 5 at which the pulses of the line frequency FH appear. When switch 9 is switched to contact N the line frequency FH of the synchronizing signal S1 and, consequently, of the pulses deriving from divider 5, is equal to 15,625 Hz. Via switch 9 the line frequency pulses of the divider 5 are fed to an input of a stage 10 which will appear to operate as a pulse blocking stage. Stage 10 comprises a pulse counter 11, a clock pulse input C of which is connected to switch 9, a reset input R to the output, carrying a signal S2, of the divider 4 and a stop, or setting, input S is connected to an output of the counter 11, while another output carries a blocking signal S3. For the operation of the counter 11 it holds that at the occurrence of the logic 1 in the signal S2 the outputs of counter 11 have the logic 0, irrespective of the supply of the line frequency FH pulses to the clock pulse input C. Counter 11 is released when the logic 0 occurs in the signal S2. The line frequency FH pulses present at the clock pulse input C then start acting upon the counter 11 and, directly or after a plurality of clock pulses, the logic 1 appears in the output signal S3. 50 clock pulses after the occurrence of the logic 1 in the signal S3 i.e. after 50 line periods TH, the logic 1 appears at the output of 11 connected to the stop, or setting, input S. This causes counter 11 to stop, that is to say the logic 0 occurs again in the signal S3 and the supply of pulses to the clock input C no longer affects the counter 11, until in the next field period TV, counter 11 is reset by means of the signal S2 (logic 1) and released thereafter (logic 0). It is obvious, that, alternatively, other embodiments of a 50-pulses counter can be used.

It appears that in each field period TV the output signal S3 of the 50-pulses counter 11 has a pulse having the logic 1, i.e. a positive voltage value, during 50 line periods TH. The signal S3 is applied to a selector contact N of a switch 12 which, in addition, comprises a free selector contact M. Switches 9 and 12 are coupled, in a manner not shown in the drawing, so that the selector contacts N or M are simultaneously through-connected. The master contact of the switch 12 is connected via a resistor 13 to the base of an npn-transistor 14, the emitter of which is connected to the ground potential (logic 0) and the collector, via a resistor 15, to a terminal having a positive value +u (logic 1). The collector of the transistor 14 is also connected to an input of an AND-gate 16, another input of which is connected to the output of the divider 3 and whose output is connected to the input of the divider 4. Gate 16 can be dispensed with, it being possible to connect the collector of the transistor 14 directly to the junction of the dividers 3 and 4 (shown in the drawing by means of a dotted line) if in the implementation of the divider 3 the output thereof may be periodically connected to ground or to the voltage +u, respectively, via the collector and emitter path of the transistor 14 or via the resistor 15, respectively.

It appears that when the logic 0, i.e. the ground potential, is present in the signal S3, the transistor 14 is cut-off, so that gate 16, having the voltage +u as the logic 1, is released. The 2FH pulses of double the line frequency coming from the divider 3 are then fed, unimpeded, to the divider 4. The occurrence of the logic 1 in the signal S3 in the field period TV which lasts for 50-line periods TH, causes the resistor 14 to conduct and the ground potential to be fed to the gate 16, which is cut-off as a consequence thereof. In this way pulse blocking stage 10 prevents the 2FH pulses of double the line frequency from being fed to the divider 4 during 50 line periods TH. Consequently, the divider 4 no longer operates (continuously) as a divide-by-525 divider but as a divider-by-625 divider 4'. Starting from the line frequency FH=15,625 Hz in the signal S1, the field frequency FV=50 Hz appears at the output of the divider 4'.

It appears, that in the N-position of the generator as shown in the FIGURE, the signal generator 7 generates a synchronizing signal SN at the output terminal 8 with, at the one hand, the 6 pre-equalizing and 6 post-equalizing and 6 field serration pulses prescribed in the N-standard and, on the other hand, with 625 lines and a field frequency of 50 Hz as prescribed, together, in the N-standard.

For completeness it should be noted that switch 12 has been provided to ensure that transistor 14 can absolutely not become conductive in the M-position.

Not any arbitrary instant in the field period TV may be chosen for stopping the divider 4 for 50 line periods TH, since, the divider 4 has connections to the synchronizing signal generator 7 through which information required for composing the synchronizing signal is transmitted. For that reason the stopping of the divider 4 should not be done in or near the field blanking period in which the field synchronizing information is processed, but in a portion of the field period TV during which no information is applied from the divider 4 to the generator 7. The FIGURE shows schematically for the signals S2 and S3 approximately the center of the field period TV, given by way of example, for stopping the divider 4.

What is claimed is:

1. A switchable synchronizing-signal generator suitable for several television standards, comprising a clock pulse generator, a plurality of frequency dividers coupled to said clock pulse generator and including a first divider for supplying pulses at double the line frequency and a second divider coupled to said first divide and arranged to divide by 525, and a synchronizing signal generator coupled to said dividers, wherein said synchronizing signal generator comprises a pulse blocking stage for selectively blocking, during 50 line periods of each field period, the supply of pulses at double the line frequency to said second divider, thereby effectively changing the second divider from being a divide-by-525 divider to a divide-by-625 divider when the synchronizing signal according to the N-standard, with 625 lines and a field frequency of 50 $H_z$, is desired.

2. A switchable synchronizing signal generator as claimed in claim 1, wherein a third divider of said plurality of dividers supplies pulses at the line frequency, and wherein said pulse blocking stage includes a 50 pulse counter having a clock input connected to said third divider, a reset input connected to said second divider, and an output, carrying a blocking signal which lasts for 50 line periods, connected between said first and said second dividers.

3. A switchable synchronizing signal generator as claimed in claim 2 which further comprises a gate coupled between said first and said second dividers, wherein a first input of said gate is connected to said first divider, a second input of said gate is connected to said 50-pulse counter output, and an output of said gate is connected to said second divider.

* * * * *